Dec. 28, 1954 L. W. ORR ET AL 2,698,399
MAGNETIC DEFLECTION MEANS FOR ELECTRON DISCHARGE DEVICES
Filed July 11, 1951 7 Sheets-Sheet 1
FIG. 1.
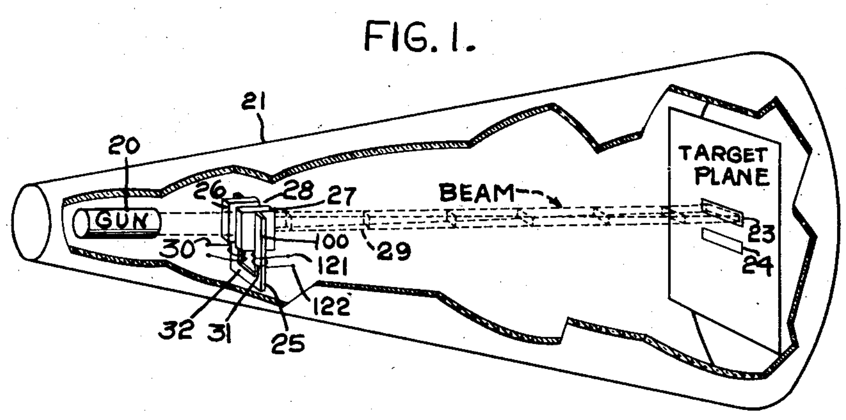
FIG. 4. FIG. 5.
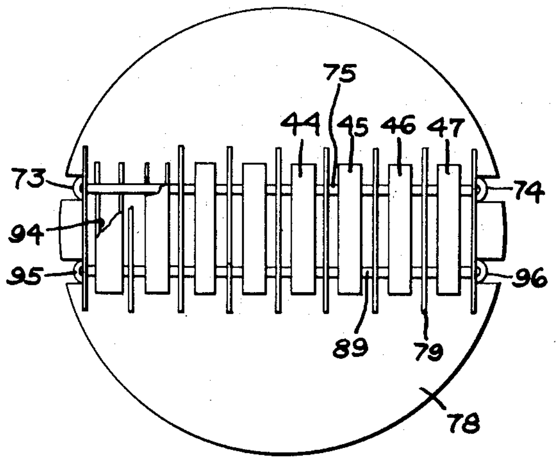
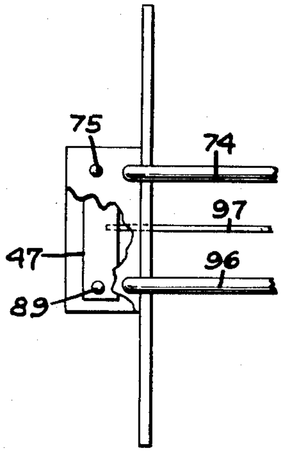
INVENTORS
LYMAN W. ORR
EUGENE A. SANDS
BY
Fidler, Crouse & Beardsley
ATTORNEYS

MAGNETIC DEFLECTION MEANS FOR ELECTRON DISCHARGE DEVICES

Filed July 11, 1951 7 Sheets-Sheet 2

*INVENTORS*
LYMAN W. ORR
EUGENE A. SANDS
*BY* Fidler, Crouse & Beardsley
ATTORNEYS Dec. 28, 1954 L. W. ORR ET AL 2,698,399

MAGNETIC DEFLECTION MEANS FOR ELECTRON DISCHARGE DEVICES

Filed July 11, 1951 7 Sheets-Sheet 3

INVENTORS
LYMAN W. ORR
BY EUGENE A. SANDS
Fidler, Crouse & Beardsley
ATTORNEYS

MAGNETIC DEFLECTION MEANS FOR ELECTRON DISCHARGE DEVICES

Filed July 11, 1951 7 Sheets-Sheet 4

| MAGNET A | MAGNET B | MAGNET C | TARGET ELECTRODE |
|---|---|---|---|
| 1 | 1 | 1 | 40 |
| 0 | 1 | 1 | 41 |
| 1 | 0 | 1 | 42 |
| 0 | 0 | 1 | 43 |
| 1 | 1 | 0 | 44 |
| 0 | 1 | 0 | 45 |
| 1 | 0 | 0 | 46 |
| 0 | 0 | 0 | 47 |

INVENTORS
LYMAN W. ORR
EUGENE A. SANDS
BY
Fidler, Crouse & Beardsley
ATTORNEYS

INVENTORS
LYMAN W. ORR
EUGENE A. SANDS
BY
Fidler, Crouse & Beardsley
ATTORNEYS

MAGNETIC DEFLECTION MEANS FOR ELECTRON DISCHARGE DEVICES

Filed July 11, 1951 7 Sheets-Sheet 6

INVENTORS
LYMAN W. ORR
EUGENE A SANDS
BY
Fidler, Crouse & Beardsley
ATTORNEYS

MAGNETIC DEFLECTION MEANS FOR ELECTRON DISCHARGE DEVICES

Filed July 11, 1951 7 Sheets-Sheet 7

FIG. 11.

| MAGNET A AUGEND | MAGNET B ADDEND | MAGNET C CARRY | SUM | CARRY | INTERCEPTING TARGET ELECTRODE |
|---|---|---|---|---|---|
| 1 | 1 | 1 | 1 | 1 | 40 |
| 0 | 1 | 1 | 0 | 1 | 41 |
| 1 | 0 | 1 | 0 | 1 | 42 |
| 0 | 0 | 1 | 1 | 0 | 43 |
| 1 | 1 | 0 | 0 | 1 | 44 |
| 0 | 1 | 0 | 1 | 0 | 45 |
| 1 | 0 | 0 | 1 | 0 | 46 |
| 0 | 0 | 0 | 0 | 0 | 47 |

FIG. 12.

| | STAGE I | STAGE II | STAGE III | STAGE IV | STAGE V |
|---|---|---|---|---|---|
| CONTROL GRID INPUT PULSE | | | | | |
| CLEAR PULSE | | | | | |
| INPUT TO MAGNET A | 0 | 1 | 0 | 1 | |
| INPUT TO MAGNET B | 0 | 1 | 1 | 0 | |
| CARRY INPUT TO MAGNET C | | | 1 | 1 | 1 |
| TOTAL (on sum bus) | 0 | 0 | 0 | 0 | 1 |

INVENTORS
LYMAN W. ORR
EUGENE A. SANDS
BY Fidler, Crouse & Beardsley
ATTORNEYS

United States Patent Office 2,698,399

Patented Dec. 28, 1954

2,698,399

MAGNETIC DEFLECTION MEANS FOR ELECTRON DISCHARGE DEVICES

Lyman Walton Orr, Springfield, and Eugene Arthur Sands, Philadelphia, Pa., assignors to Burroughs Corporation, a corporation of Michigan Application July 11, 1951, Serial No. 236,186

8 Claims. (Cl. 315—21)

This invention relates generally to electron discharge devices of the electron beam generating type and more particularly to improvements in electron beam generating devices utilizing magnetic deflection means to determine the path of said electron beam.

In many electrical circuits it is necessary to electrically select one of a plurality of channels or circuits. For example, in the field of telephony one of many trunk circuits or line link circuits must be chosen to transmit intelligence. In the computting machine art one of a plurality of circuits which may be available to perform different operations such as addition, multiplication, or other functions, must be selected. In another illustration relating to the computing art many calculating machines and systems utilize a binary code wherein a number is represented by powers of two. Arithmetical operations involving numbers represented by a binary code frequently can be performed by a plurality of circuits constructed in accordance with truth tables which set forth the various combinations and results thereof of binary characters involved in an arithmetical operation. Such circuits require the proper selection of a specific one thereof. In other arts, there exist many other instances where a selection of one of a plurality of channels must be made. Some means is required to perform the selection of the proper channel or circuit in accordance with the desired operation. This can be done in a well known manner with a system of relays or an array of electron discharge tubes arranged in a coordinate manner so as to select a particular one of a plurality of channels. An alternative method of selecting channels or circuits involves an electron discharge device commonly referred to as a cathode ray tube. This electron discharge device comprises a means for generating an electron beam, a plurality of targets and a deflection system whereby the electron beam can be caused to selectively impinge upon any one of said plurality of targets. The use of electrostatic deflection systems presents certain difficulties inasmuch as the deflecting voltage impressed thereon is not easily reproduced. Consequently, there is some possibility that an electron beam would not always be deflected so as to impinge upon the selected target electrode. Although this difficulty can be overcome to a large extent by the use of control circuits, it is desirable to have a device wherein the electron beam is inherently caused to impinge accurately upon the selected one of a plurality of targets by a more easily reproducible electron beam deflecting force. Existing magnetic electron beam deflecting means present much the same difficulties as do the electrostatic deflection means with respect to the reproducibility of the electron beam deflecting force.

An object of the invention is the improvement of electron discharge devices of the electron beam type generally.

Another object of this invention is to obtain easily reproducible electron beam deflection forces.

Another object of the invention is to provide for accurate deflection of an electron beam to a preselected one of a plurality of target electrodes.

A further object is to provide a means of accurately storing information for an indefinite length of time and wherefrom said information can be extracted an indefinite number of times without erasing said information from storage.

A specific object is to provide a structure enclosed within a hermetically sealed envelope and which comprises an electron gun positioned at one end thereof for generating an electron beam toward a plurality of targets positioned at the other end, and which further comprises one or more magnetic deflecting means adapted to deflect the beam in accordance with the residual magnetism therein and means for selectively energizing said deflecting means momentarily to at least the saturation point thereof in one polarity or the other, whereby the deflecting force thereof will always be of fixed, reproducible value.

A more specific object of the invention is to provide individual electron beam magnetic deflecting units having associated therewith circuit means which are adapted to cause said electron beam deflecting units to become saturated with magnetic flux in conformitv with a predetermined code and to position a plurality of these magnetic deflection units so that each has a properly weighted residual magnetic flux with respect to the others and with respect to its position in the device and to the position and spacing of a plurality of target electrodes, whereby the electron beam will selectively impinge upon any one of the plurality of targets in accordance with the said predetermined code.

Another specific object is to utilize a device of the above character in a novel calculating machine.

Still another specific object is to provide a novel and simple binary adding apparatus of exceptionally high speed and accuracy wherein the corresponding characters of the binary numbers to be added and the carry, if any, are simultaneously impressed on respective deflection units of the above character whereby the electron beam will be deflected to impinge on a particular target which will indicate the correct sum and whether or not there is a carry and which will, at the proper time, couse the carry, if any, to be introduced in the succeeding operation.

These and other objects and features of the invention will be more fully understood from the following detailed description when read in conjunction with the drawings in which:

Fig. 1 is a perspective view of a device illustrating the basic principles of the invention;

Fig. 4 is a front elevation view of the target structure of the tube and having a part thereof broken away;

Fig. 5 is a bottom-end view of Fig. 4 with a part thereof broken away;

Fig. 11 is a binary code truth table; and

Fig. 12 is a chart illustrating the manner in which two binary digits are added by means of the binary serial adder of Fig. 10.

Figure 2:
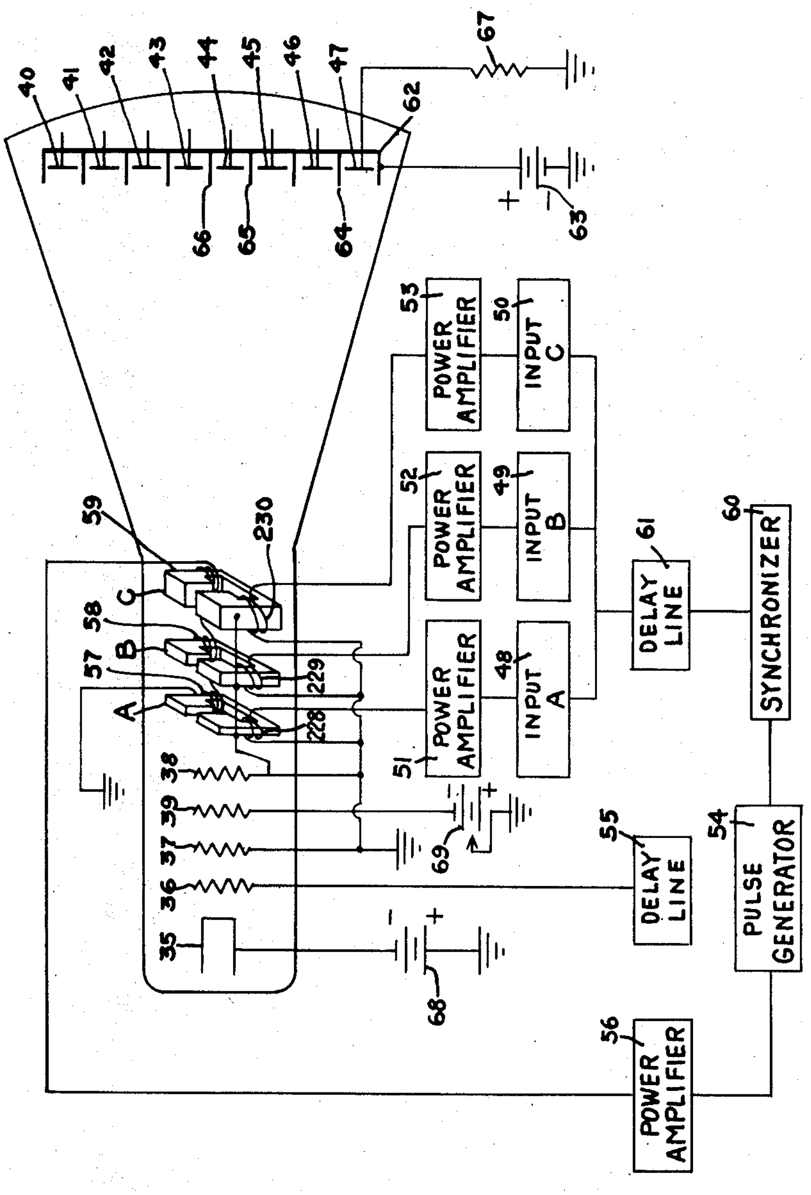
Fig. 2 is a schematic diagram of the device showing the deflecting elements in perspective and the associated control circuits in block diagram form.

Generally stated, in carrying out the invention each of the deflection units is made in the form of a magnetic core structure having juxtaposed pole faces arranged on opposite sides of the electron beam and each unit is provided with windings connected to an energizing source for momentarily magnetizing the core structure thereof up to the saturation point in either direction whereby the residual magnetism or magnetic remanence in one sense will apply to the electron beam a deflecting force which will differ by a predetermined and fixed amount from the deflecting force applied by the residual magnetisms in the opposite sense. Inasmuch as the maximum residual magnetism in either sense of a particular core structure is fixed and always will return to this fixed amount after it has been momentarily magnetized at least up to its saturation point in this particular sense, the only requirement for exactly reproducing an indefinite number of times a certain electron beam deflection force is to apply to the energizing winding of the core a pulse of a certain polarity and of sufficient magnitude to magnetize the core structure at least up to its saturation point.

To this end there is provided as shown in Fig. 1 an electron gun 20 positioned at one end of a hermetically sealed envelope 21 and target electrodes such as elements 23 and 24 are positioned near the other end of said envelope with a magnetic deflecting unit 25 positioned between said electron gun 20 and the target electrodes so that the pole pieces 26 and 27 of the magnetic deflecting unit 25 form a gap 28 through which the electron beam 29 can pass. Windings 30 and 31 are wound around yoke 32.

Fig. 2 illustrates the use of several deflection units together with control circuits therefor for accurately deflecting an electron beam to a preselected one of a plurality of targets. To this end cathode 35, grid 36, accelerating electrodes 37 and 38 and focusing electrode 39 are provided for generating an electron beam directed toward target electrodes 40, 41, 42, 43, 44, 45, 46, and 47. The target electrodes may be coated with a secondary electron emission material such as one of the silver-magnesium alloys to produce a larger output signal having a positive polarity. Three electron beam magnetic deflection units A, B, and C are interposed in the path of the electron beam. It is to be noted that more or less than three deflecting units may be used. In the embodiment shown in Fig. 2 each of these three magnetic deflecting units has an input means individual thereto. Specifically, input source 48 is associated with deflecting unit A, input source 49 is associated with magnetic deflecting unit B, and input source 50 is associated with magnetic deflecting unit C. Power amplifiers 51, 52, and 53 are provided in order to supply the required power to windings 228, 229, and 230, respectively. The control grid 36 is energized by voltage pulse generator 54 through delay line means 55 and performs the function of controlling the density of the electron beam. The electron beam can be maintained in an off condition by applying a sufficiently negative potential to grid 36. A power amplifier 56 is arranged to impress simultaneous current pulses, herein defined as clear pulses, upon windings 57, 58, and 59 of magnetic deflecting units A, B, and C, respectively, from pulse generator 54. For reasons which will be explained in detail later, the clear pulses, the pulses applied to grid 36, and the pulses applied to the deflection units from the three input sources 48, 49, and 50 must be synchronized. This is accomplished by means of synchronizing means 60. The function of delay line means 61 is to delay the input of current pulse from input sources 48, 49, and 50 until after the clear pulse from source 56 has energized and de-energized windings 57, 58, 59 of magnetic deflecting units A, B, and C respectively. Shielding element 62 is grounded through positive 200 volt battery source 63 and comprises individual target electrode separators such as 64, 65, and 66. The shielding element 62 should be held at a sufficiently positive potential with respect to all the target electrodes to draw off all the secondary electrons which may be released by impingement of the electron beam on any target. Each of the targets such as electrode 47 can be grounded through a resistance such as 67 individual thereto. 1000 volt potential source 68 and variable 500 volt potential source 69 provide the potential for respectively accelerating and focusing the electron beam.

Figures 6, 7:
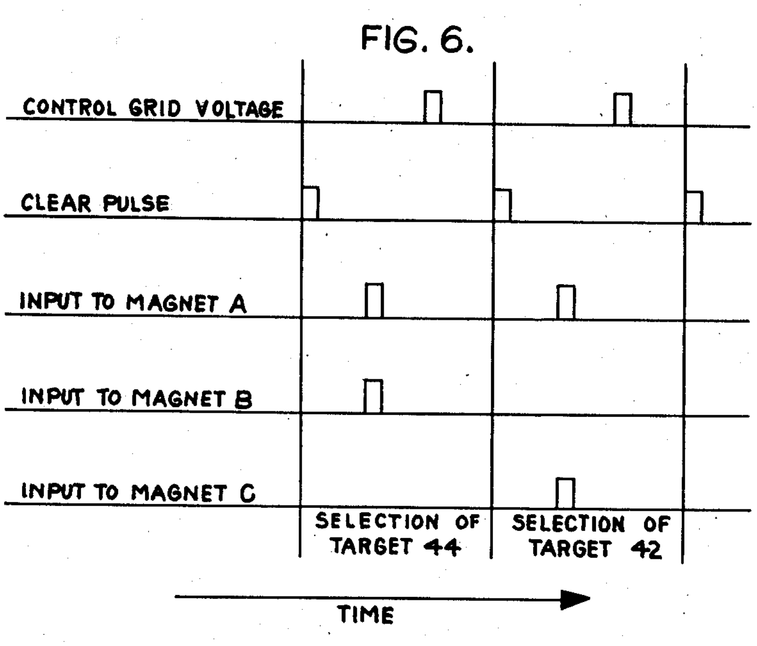
Fig. 6 is a chart showing the time relationship of typical current input pulses of the control and input circuits shown in Fig. 2.
Fig. 7 shows the relationship between the energization of various combinations of the individual electron beam deflecting magnetic units and the selected target electrode.

The magnetic deflection units A, B, and C of the preferred embodiment of the invention described herein are weighted as to the amount of deflection they will produce with respect to the electron beam in the plane of the target assembly. More specifically, from a condition of maximum residual flux of one polarity to a condition of maximum residual flux of the opposite polarity the magnetic deflection unit A will produce a change of one unit of deflection of the electron beam, that is to say, it will move the electron beam from one target to an adjacent target, as for example, from target 44 to target 45. Magnetic deflection unit B is weighted to produce two units of deflection of the electron beam. For example, it will move the electron beam from target 44 to target 46. Magnetic deflection unit C is weighted to produce four units of deflection of the electron beam as, for example, from target 43 to target 47. It is to be understood that each of the magnetic deflection units A, B, and C produces the above described deflection changes of the electron beam from a state of maximum residual flux of one polarity to a state of maximum residual flux of the other polarity. It can be seen from the chart of Fig. 7 that there are eight possible combinations of states for magnetic deflection units A, B, and C. In the chart of Fig. 7 let the character "1" represent a residual flux in what will be designated a positive polarity and let the character "0" represent the maximum residual flux in what will be designated the negative polarity. It can be seen that when the magnetic deflection elements A, B, and C all have the maximum residual flux of a positive polarity the electron beam will be deflected so as to impinge upon electrode 40. When magnetic deflection unit A is caused to have its residual flux in the negative polarity, with B and C retaining their residual flux in the positive polarity, the electron beam will be deflected one unit downward in the tube of Fig. 2 to impinge upon target electrode 41. The chart in Fig. 7 illustrates the other various combinations of states of maximum residual fluxes of the magnetic deflection units A, B, and C including the one where all three magnetic deflection units have a residual flux of a negative polarity. Under these conditions the electron beam is deflected to impinge upon target electrode 47.

Figure 3:
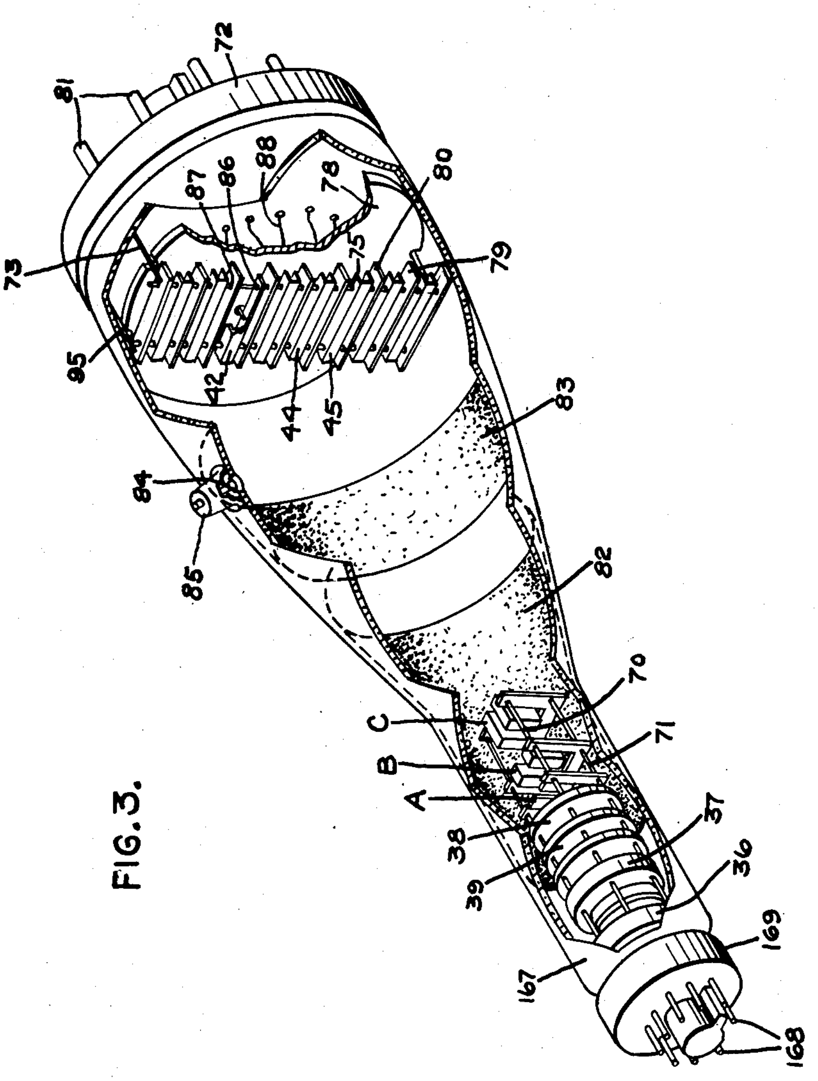
Fig. 3 is a perspective view of the tube with the envelope and other parts broken away.

In Fig. 3 a more detailed construction of the device is shown. Mounted coaxially within the envelope 167 is an electron gun which comprises a cathode, a beam modulating or control electrode 36, focusing and accelerating anodes 39, 37, and 38 connected electrically to respective terminals 168 on base 169. The windings on the magnetic deflection elements A, B, and C may be connected to appropriate base pins 168. The electron gun may be of conventional construction and, in order to simplify the drawing, the electrodes thereof are shown in outline form in Fig. 3 and some of the circuits and lead conductors therefor have been omitted. Insulating supports such as 70 and 71 are shown. Supported by these supports are electron beam magnetic deflecting units A, B, and C. These units are weighted in a manner similar to the weighting of the magnetic deflection units described with respect to Fig. 2. That is to say, deflection unit A will produce one unit of deflection of the electron beam, deflection unit B will produce two units of deflection of said electron beam, and deflection unit C will produce four units of deflection of the electron beam. Proper alignment of the electron gun, focusing, and accelerating electrodes and the magnetic deflecting units A, B, and C is required so that the electron beam will pass between the pole piece faces of the magnetic deflecting units A, B, and C.

At the other end of said envelope 167 a target assembly is mounted to the base 72 by means of support rods such as 73 and 95. Other support rods such as rod 75 of an insulating material pass through apertures provided therefor in the target electrodes such as 44 and 45. Shielding structure 78 has individual separators such as 79 and 80 which effectively isolate each target electrode from every other target electrode, and may be used to collect secondary electrons liberated therefrom. It is to be noted that the insulating rod 75 also passes through apertures provided therefor in the separators of the shielding structure 78. Each of the target electrodes has a lead-in conductor spotwelded or otherwise secured thereto, such as conductor 88 connected to the target electrode 44. These lead-in conductors are connected respectively to the terminal pins such as 81. The shielding structure 78 is similarly connected to one of the base pins 81.

The innerside of the envelope 167 has two portions therein coated with an electrically conductive material, for example, a colloidal graphite known commercially as "Aquadag." One of these coatings is identified by the reference character 82 and the other by the reference character 83. An electrical connection may be established with the coating 83 by way of a conductor 84 extending from terminal 85 to the inside of the envelope 167.

Each of the target electrodes is secured to a support rod 75 by means of an insulating cement. One such joint is indicated by reference character 86. In a like manner the shielding structure 78 is secured to support rod 75 by insulating cement. Such a joint is illustrated by reference character 87. The support rods such as 73 and 95 are secured within the base 72 and perform the function of supporting the shielding structure 78 and the target electrodes.

In Fig. 4 the individual target electrodes such as 44, 45, 46, and 47 are shown fastened to the support rods 89 and 75. Said insulating support rods 89 and 75 are supported by the shielding structure 78 by means of the support rods 89 and 75 passing through apertures provided therefor in the shielding separators such as separator 79 of the shielding structure 78. In the broken away section of Fig. 4 one of the individual conductors connecting a target electrode to one of the terminal pins 81 of Fig. 3 is designated as element 94. Support rods 73, 74, 95, and 96 hold the unitary target assembly stationary with respect to the base 72 of Fig. 3.

In Fig. 5 an end section of Fig. 4 with the portion thereof broken away is shown. Target electrode 47 is herein shown supported by support rod 89. Conductor 97 electrically connects target 47 to one of the terminal pins 81 of Fig. 3.

Figure 8:
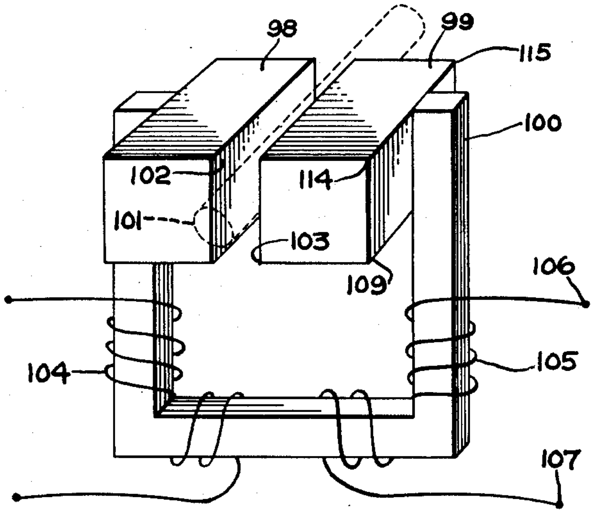
Fig. 8 is a perspective view of a typical electron beam magnetic deflection unit.

In Fig. 8 a detailed view of one of the electron beam magnetic deflector units is shown. These deflecting units such as the one shown in Fig. 8 are constructed of a ferrite material which has a relatively small saturation flux density and a relatively large resistivity. The second mentioned property is desirable from the viewpoint of decreasing the eddy current effect when a change of flux is occurring in the deflector unit, thus maintaining a near optimum speed of operation. Pole pieces 98 and 99 are supported by yoke 100. The electron beam 101, under normal operating conditions, will pass between pole piece faces 102 and 103. The exciting windings 104 and 105 in the preferred embodiment of the invention herein described have about 400 turns each. To switch a deflection unit from positive to negative residual flux, a current pulse of appropriate polarity may be applied to terminals 106 and 107 of coil 105. This current pulse must be sufficiently large to cause substantial saturation of the yoke 100. Upon cessation of the current pulse, the yoke 100 will have a certain reproducible maximum residual magnetism therein which will cause a reproducible deflection of the electron beam 101. It can be seen that the only criterion for reproducible operation is a minimum current pulse. This minimum current pulse must be sufficient to saturate the yoke 100. Any current pulse in excess of this minimum value will not change the value of the residual flux remaining in yoke 100 upon the cessation of the current pulse. Similarly, a minimum current pulse of the opposite polarity is the only criterion for a reproducible deflection of the electron beam in the opposite direction. The coil 104 may be used for several functions, for example, it may be used to return the magnetic deflection element unit to a state of normality which can be arbitrarily designated to mean a condition of maximum residual flux of either sign. The minimum current pulse required to cause saturation of the yoke 100 for the preferred embodiment of the invention described herein is about 50 milliamperes.

With respect to the order of dimensions used in the magnetic deflection units, the yoke 100 can have a cross sectional area of about 0.005 square inch. The distance of the gap between pole-piece faces 102 and 103 is of the order of 0.080″. The thickness of the pole pieces measured from point 109 to point 114 is about 0.4″. The length of the pole pieces or the distance from point 114 and point 115 varies with the position of the pole piece along the longitudinal axis of the electron beam.

Figure 10:
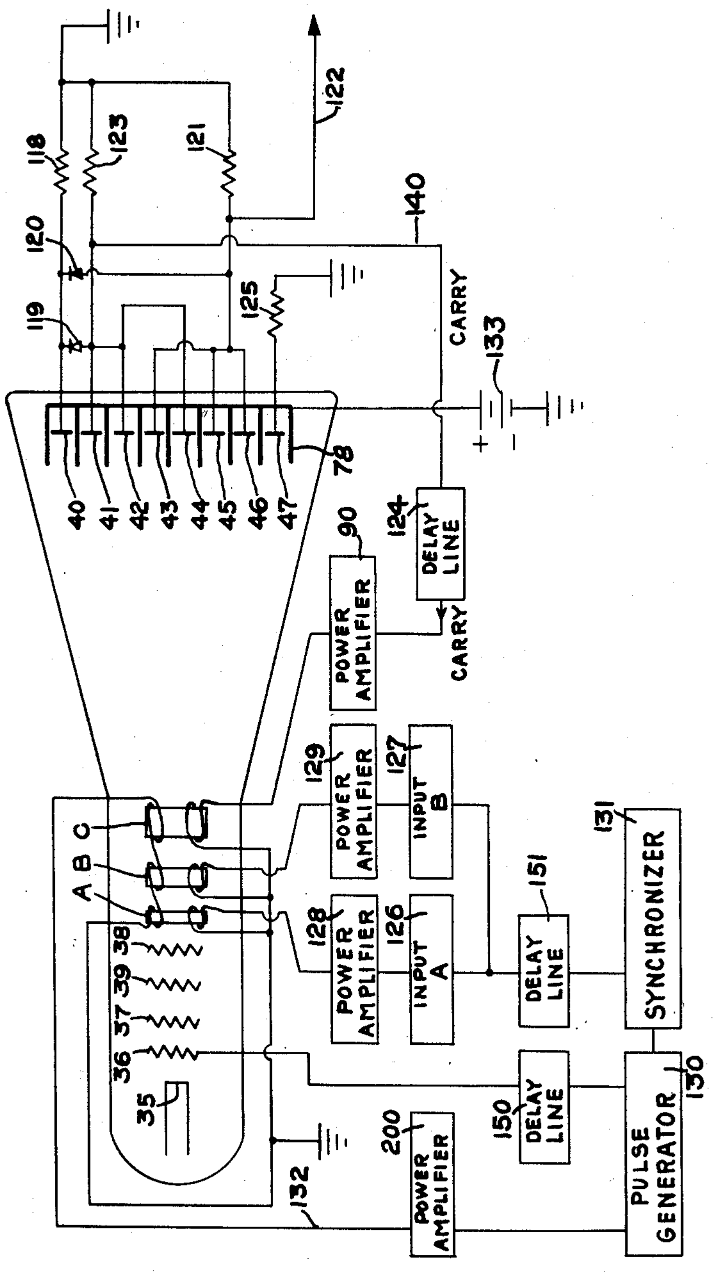
Fig. 10 is a schematic view of an adaptation of the device as a binary serial adder.

In Fig. 10 a utilization of the tube is made in a binary adder. Cathode 35, control grid 36, and the focusing and accelerating electrodes 39, 37, and 38 provide means to generate, accelerate, and focus an electron beam toward the target assembly of the tube. Positioned between the electron gun assembly and the target assembly are three electron beam deflection units A, B, and C.

These units are weighted in a manner similar to the weighting of the magnetic deflection units described with respect to Fig. 2. That is to say, deflection unit A will produce one unit of deflection of the electron beam, deflection unit B will produce two units of deflection of said electron beam, and deflection unit C will produce four units of deflection of the electron beam. Target electrode 40 is connected to ground through resistance 118, to targets 41, 42, and 44 through asymmetrical device 119 and to electrodes 43, 45, and 46 through asymmetrical device 120. The said target electrodes 43, 45, and 46 are connected to output lead 122 and are also connected to ground through resistance 121. The target electrodes 41, 42, and 44 are connected to a winding on magnetic deflection unit C through conductor 140, delay line 124, and power amplifier 90 and also to ground through resistance 123. Target 47 is connected to ground through resistance 125. Shielding means 78 is connected to ground through a positive voltage supply 133 of sufficient voltage to draw off all secondary electrons produced by impingement of the primary beam on any of the said target electrodes. Input sources 126 and 127 provide current input pulses to magnetic deflection units A and B respectively through power amplifiers 128 and 129 respectively. At the proper time determined by synchronizing means 131, pulse generator 130 is connected to all three magnetic deflection units A, B, and C through power amplifier 200 and conductor 132, and performs the function of causing said magnetic deflection units to assume a cleared position which can arbitrarily be chosen to be that condition wherein magnetic deflection units A, B, and C all have a residual magnetic flux therein of a negative polarity so that the electron beam will be deflected upon target electrode 47. Pulse generator 130 may also be utilized to provide periodic pulses herein denoted as clock pulses to the grid 36 through delay line means 150. It is to be noted that synchronizing means 131 provides for proper time relationship between the inputs to magnetic deflection elements A and B, clock pulses to grid 36, and the clearing or normalizing pulses to the magnetic deflection units A, B, and C through conductor 132. Synchronizing means 131 is connected to input A and input B through delay line means 151.

Figure 9:
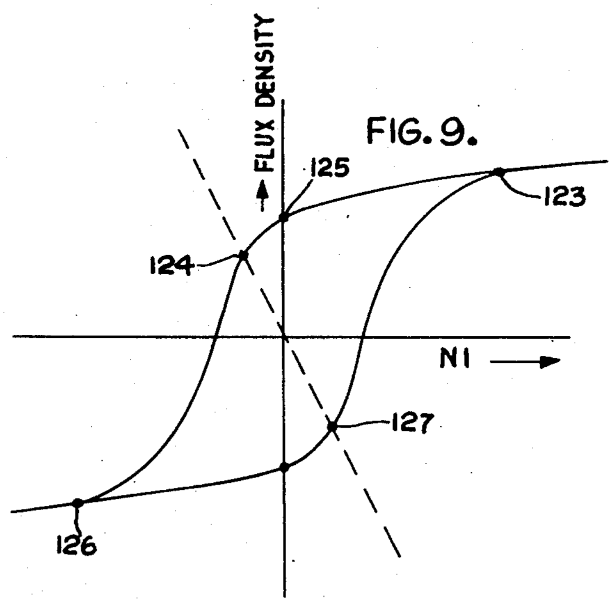
Fig. 9 shows a representative B—H curve of the yoke material used in the structure shown in Fig. 8.

Referring now to Fig. 1 the principles of operation of the device will be described. A hysteresis loop for the material of the yoke 100 is of a generally rectangular form as shown in Fig. 9. This loop represents the flux density changes obtained as the magnetizing force (NI) is varied over a large range of values. The loop shown is for a uniform cross-section closed toroidal sample of the material which is commonly known in the art as rectangular hysteresis loop magnetic material. For the purposes of the present invention a rectangular hysteresis loop material of the type described in an article entitled, "Digital Information Storage in Three Dimensions Using Magnetic Cores" by J. W. Forrester, appearing in the January, 1951 issue of the Journal of Applied Physics may be employed. A magnetic material of this type, which has suitable characteristics is manufactured by The Alleghany Ludlum Steel Corporation, Pittsburgh, Pennsylvania, and is available on the market under the trade-mark "Deltamax."

When the NI is increased above the point 123 and then returned to zero, the residual flux density in the closed toroid returns to point 125.

When a structure containing an air gap is used (such as shown in Fig. 8), the residual flux density returns to point 124 of Fig. 9. The dashed line represents the magnetic properties of the air gap, and the intersection at point 124 determines the operating point. If a current pulse of sufficient magnitude is applied to terminals 121 and 122 of coil 31 of Fig. 1 to cause saturation of yoke 100 as represented by point 123 on the curve of Fig. 9, then upon cessation of said pulse the density of the residual magnetism remaining in the yoke will be of a value as represented by point 124 of the curve of Fig. 9. It is to be noted that the density of the residual magnetic flux will not be of the value represented by point 125 of Fig. 9 because of the air gap 28 in the flux path. This phenomenon is well known in the magnetic design art and will not be discussed further. The intensity of flux across the air 28 which is caused by the said residual magnetic flux remaining in the yoke 100 of Fig. 1 as represented by the point 124 of Fig. 9 will cause a certain deflection of an electron beam since it is substantially perpendicular to the path of said electron beam. Target 23 of Fig. 1 is so positioned that the deflected electron beam will impinge thereon. If another pulse of sufficient magnitude to cause saturation of the yoke 100 to a degree not less than that represented by point 123 of Fig. 9 is applied to terminals 121 and 122, then upon cessation of said second current pulse the density of the residual magnetic flux will again be of a value as represented by point 124 of the curve of Fig. 9. Thus, it can be seen that if a current pulse of a certain minimum value is caused to flow through coil 31 such that the yoke 100 of Fig. 1 is saturated to at least the degree represented by point 123 of Fig. 9, then the density of residual magnetic flux remaining in said yoke will always be the same; that is to say, it will always be of the value represented by the point 124 of Fig. 9. Consequently, the deflection of the electron beam will always be the same, assuming that the velocity of the electron beam as it passes through the gap 28 of the magnetic deflection unit remains constant.

In a similar manner, if a pulse of the opposite polarity is applied to terminals 121 and 122 of coil 31 of Fig. 1 and if said pulse is not less than the minimum value required to saturate the yoke 100 to the point represented by point 126 of the curve of Fig. 9, then the density of the residual magnetic flux remaining in the yoke 100 will always be represented by the point 127 of the curve of Fig. 9. The electron beam will then be deflected in an opposite direction and will impinge upon target 24 of Fig. 1 which has been positioned accordingly. Thus, the electron beam can be caused to assume two positions, each position being easily reproducible since the only criterion is that the current pulses applied to the coil 31 shall not be less than a certain minimum value. Coil 30 may be utilized in the same manner as coil 31. Plus or minus current impulses may be caused to flow through winding 30 to cause saturation of the yoke 100. Alternatively, coil 30 may be utilized for magnetizing the yoke 100 in one polarity and the coil 31 may be utilized for magnetizing said yoke in the other polarity. It can be seen that the magnetic deflection unit may be magnetized while the electron beam is in an off condition, and further, that the magnetic deflection unit will retain its magnetism, which can represent intelligence, for an indefinite length of time. Consequently, the device may be utilized as a means of storing information as well as a means of selecting one of many channels or circuits.

In Fig. 2 a device is shown having three magnetic deflection units A, B, and C. As discussed hereinbefore, these deflection units are weighted in such a manner that until A will cause electron beams to deflect a distance of one unit, deflection unit B will cause the electron beam to deflect a distance of two units and unit C will cause the electron beam to deflect a distance of four units. The units of distance have been herein defined as being the distance from the center of one target to the center of an adjacent target. Assume that a clear pulse is transmitted to the windings 57, 58, and 59 of magnetic deflection units A, B, and C, respectively, from power amplifier 56. This will cause the three magnetic deflection units A, B, and C to assume their maximum residual magnetic fluxes, all of the same polarity which can arbitrarily be called the negative polarity, thus causing the electron beam to be deflected to target electrode 47. If desired, the magnetic deflection units A, B, and C could all be magnetized in the opposite or positive polarity and thus cause the electron beam to be deflected to the target 40. However, in the specific embodiment shown in Fig. 2, let it be assumed that the electron beam was deflected upon target electrode 47 upon application of a clear pulse to the windings 57, 58, and 59. It is to be noted that although language is used herein indicating that the electron beam is in an on condition during the application of a clear pulse, this is not necessarily true, since the magnetic deflecting forces may be established while the beam is off, and then when the beam is turned on, it will assume a path in accordance with the established magnetic deflection. In the operation herein described, such is the case. Let it be further asssumed that it is desired to cause the electron beam to impinge upon target 44. Current pulses of a proper magnitude are caused to be conducted through the coils 228 and 229 of magnetic deflection units A and B respectively. The polarity of these pulses is such as to cause the yokes of the magnetic deflection units A and B to acquire a maximum residual magnetism of a positive polarity. Thus, deflection unit A will provide a deflective force of sufficient magnitude to cause the electron beam to move one unit of distance such as from target 47 to target 46 and magnetic deflection unit B will provide sufficient deflective force to deflect the electron beam two units of distance such as from target 46 to target 44. Consequently, the energization of windings 228 and 229 and resultant maximum residual magnetic flux remaining in the associated yokes will cause the electron beam to be deflected from target electrode 47 to target electrode 44. Since it is not desired to have the electron beam in an on condition while input pulses are being applied to the windings of deflection units A, B, or C, the electron beam is caused to be in an off condition until after the residual magnetic flux has been created in the desired magnetic deflection units. Then a pulse herein designated as a clock pulse is applied to the grid 36 from pulse generator 54 through delay line 55. The time relationships of the clear input pulse, the input pulses to the magnetic deflection units, and the clock input pulse involved in the selection of target electrode 44 are shown in the chart of Fig. 6.

In another example, assume that target electrode 42 is to be selected. The magnetic deflection units A, B, and C are first cleared by application of a clear pulse to coils 57, 58, and 59. Then input pulses are applied to magnetic deflection units A and C which will cause the electron beam to be deflected a total of five unit spaces or from target 47 to target 42. Then when the electron beam is turned on by application of a clock pulse, it will impinge upon target 42. It can be seen from the chart of Fig. 6 that a definite time relationship must exist between the clear pulse, the input pulses to magnetic deflection units A, B, and C and the clock pulse. This is accomplished by the use of a synchronizer 60 and the delay lines 55 and 61. Such a synchronizer may be in the forme of a magnetic drum or other means wherefrom the clear pulses, the clock pulses and the input pulses to magnetic deflection units A, B, and C are all derived.

The proper energization of the windings 228, 229, and 230 of the magnetic deflection units A, B, and C respectively will cause the electron beam to be selectively deflected upon any one of the targets 40 through 47 in accordance with the chart of Fig. 7.

Inasmuch as the effectiveness of the deflection units of the present invention to deflect an electron beam is independent of the amount of use or lapse of time and as the deflection units will invariably and unalterably cause identical deflections of the electron beam as long as the energizing pulses exceed a certain predetermined minimum value sufficient to establish maximum residual magnetism therein, the tube illustrated in Fig. 3 is particularly suitable for applications wherein it is essential that a certain predetermined condition will always cause identical deflections of a beam. Thus because of its inherent capability of exactly reproducing certain deflections, the tube is suitable for use in connection with business machines, such as calculators, wherein random errors, no matter how infrequent, cannot be tolerated. One such application is illustrated in Fig. 10 wherein the tube is shown utilized in an arrangement for adding two binary numbers by simultaneously energizing two of the deflection units in accordance with corresponding binary characters and, at the proper time, simultaneously therewith energizing the third deflection unit in accordance with the carry, if any. To this end the deflection units A, B, and C as described hereinbefore are weighted in the same manner as in the devices shown in Figs. 2 and 3. In the apparatus shown in Fig. 10 the binary codes to be added are impressed serially upon the magnetic deflection units A and B; the significant digits of the same order of the two binary numbers to be added, being presented substantially simultaneously to the magnetic deflection units A and B. The function of the magnetic deflection unit C is to present carries into the device at the proper time. The carry is delayed by delay line means 124 until the next following binary characters in the form of current pulses are entered into the magnetic deflection units A and B. As in the case of the device shown in Fig. 2 a clear pulse is first caused to be impressed upon all of the magnetic deflection units A, B, and C. This clear pulse is generated in the pulse generator source 130. The binary digits to be added are then impressed upon the magnetic deflection units A and B; the augend being impressed upon magnetic deflection unit A and the addend being impressed upon magnetic deflection unit B. Alternatively, the augend may be impressed upon deflection unit B and the addend impressed upon deflection unit A. The possible combinations of individual characters of the augend and the addend are shown in the truth table of Fig. 11. For purposes of clarity the two conditions of maximum residual flux in a magnetic deflection unit will be defined as follows. The condition wherein the residual flux is designated as being of a positive polarity will be defined as containing a "1" or being in a "1" condition, and the condition wherein the residual flux of a magnetic deflection unit is of a negative polarity is herein defined as containing a "0" or being in a "0" condition. A positive current pulse of sufficient magnitude applied to the coil of a magnetic deflection unit will create a "1" condition and a negative current pulse of sufficient magnitude will create a "0" condition. The "1" and "0" herein used are in accordance with the nomenclature commonly used in binary coded characters and will be referred to as binary characters. Returning now to the explanation of the truth table of Fig. 11, assume that a "1" is contained in magnetic deflection unit A and that a "1" is contained in magnetic deflection unit B. Further assume that from a previous operation there has been a carry of "1" which will be caused to be contained in magnetic deflection unit C by means of a positive pulse conducted through the delay line 124. The sum of these three binary coded "1's" will be a "1," and there will be a carry of "1" for the next following addition operation. Consequently, the magnetic deflection units A, B, and C will all be magnetized with a positive polarity and the electron beam will be deflected to the target electrode 40 which in turn must be connected to both a terminal herein defined as a sum bus 122 and a conductor herein defined as a carry bus 140. Such a circuit can be traced from target electrode 40 through crystal diode 119 to carry bus 140. A circuit to the sum bus can be traced from target electrode 40 through crystal diode 120 to sum bus 122.

Should the binary character "0" be caused to be contained in magnetic deflection unit A, a "1" be caused to be contained in magnetic deflection unit B, and a "1" carry be applied to the magnetic deflection unit C substantially simultaneously, then the electron beam will be deflected to the target electrode 41 in accordance with the truth table of Fig. 11. As can be seen from said truth table the sum of these three digits is "0" with a carry of "1." Consequently, target electrode 41 must be connected with the carry bus 140, but must not be connected with the sum bus 122. Such is the case, as can be seen from the circuit of Fig. 10. In like manner, the other possible combinations of the characters of the augend, addend, and carry are set forth in the truth table of Fig. 11.

Assume that it is desired to add the binary digit "0 1 0 1" to the binary digit "0 1 1 0," where the left hand character of each of the binary digits is the least significant digit thereof and the one first impressed upon the magnetic deflection units A and B. Therefore, a "0" is caused to be contained in magnetic deflection units A and B after the clear pulse from power amplifier 200 has been impressed upon magnetic deflection units A, B, and C. This is shown in stage I of Fig. 12. Since the input pulses to deflection units A and B are both negative pulses, the deflection units A and B are simply saturated in a negative polarity and acquire the same residual magnetism as was given to them by the clear pulse. Consequently, there is no change in the deflection of the electron beam. Furthermore, since there is no carry, the magnetic deflection unit C is not affected and retains its magnetization of negative polarity. The next two binary characters to be entered into magnetic deflection units A and B will both be "1" as shown in stage II of Fig. 12. Consequently, magnetic units A and B will acquire a residual magnetism of a positive polarity. The sum of "1" and "1" in binary code is equal to "0" with a "1" carry. Referring to the truth table of Fig. 11 it can be seen that the electron beam is deflected to target electrode 44 which is connected to the carry bus, but is not connected to the sum bus. Therefore, a positive pulse is caused to be transmitted to the carry bus 140. This carry pulse is delayed by delay line means 124 for ⅔ of a unit of time; a unit of time being herein defined as the time interval between the application of two consecutive binary characters to a magnetic deflection unit. Thus, it can be seen from Fig. 12 that the addition of two "1" characters as represented in stage II will result in the carry being delayed until the addition operation of stage III. Thus, when the third least significant digits, namely "0" in the augend and a "1" in the addend, are added together, it would ordinarily form a sum of "1" and have no carry, but since a "1" has been carried from stage II the sum will be "0" with a carry of "1" to stage IV. In stage IV a "1" in the form of a positive pulse is impressed upon magnetic deflection unit A and "0" is contained in magnetic deflection unit B. These two digits added to the carry from stage III will give a sum of "0" with a carry of "1" which will appear in stage V. Consequently, the pulses appearing on the sum bus will give the correct answer of "0 0 0 0 1." The time relationship between the clear pulse, the control grid voltage pulse or clock pulse, and the input pulses to the magnetic deflection units as shown in the chart of Fig. 12 is to be noted. In each stage the clear pulse causes the magnetic deflection units to assume what herein is termed as a normal position wherein all of the magnetic deflection units are caused to acquire a residual magnetism of a negative polarity. Then the input pulses, including a carry if any, are applied to the magnetic deflection units A, B, and C. After the cessation of these input pulses, the clock pulse is applied to the grid 36 which will cause an electron beam to be generated and be deflected to the proper target electrode in accordance with the input pulses impressed upon the magnetic deflection units A, B, and C. The electron beam is then turned off and in a short interval of time the next stage begins with the impressing of a clear pulse upon the deflection units A, B, and C and the cycle is repeated.

The function of the resistances 118 and 123, 121 and 125 is to act as load resistances for the electron beam current when it impinges upon a target associated with one of said resistances and further provide paths for secondary emission currents.

It is to be noted that the forms of invention herein shown and described are but preferred embodiments of the same and various changes may be made in materials, elements, and circuits used therein without departing from the spirit or scope of said invention.

We claim:

1. A cathode ray tube operable as a static electromagnetic storage device comprising in combination, beam positioning means including at least one magnetic deflection yoke constructed of a magnetic material having a substantially rectangular hysteresis loop, means for substantially saturating said yoke in one direction, means for substantially saturating said yoke in the opposite direction, and means for detecting information denoting the binary storage condition of said yoke, said detecting means being disposed within said cathode ray tube to receive the beam as deflected by said yoke when in different binary storage conditions to collect current from the beam at different zones within the tube.

2. A static storage apparatus comprising in combination with an electron beam discharge device, beam positioning means including at least one magnetic deflection yoke disposed to deflect the beam and constructed of a magnetic material having a substantially rectangular hysteresis loop, means for substantially saturating said yoke in one direction, means for substantially saturating said yoke in the opposite direction, a plurality of target electrodes for detecting information denoting the static binary storage conditions of said yoke, said target electrodes being disposed at different locations within the envelope of said cathode ray tube to intercept respectively the beam as deflected by the yoke when in different remanence conditions.

3. A cathode ray tube operable as a static electromagnetic storage device comprising in combination, beam positioning means including at least one magnetic deflection yoke constructed of a magnetic material having a substantially rectangular hysteresis loop, means for substantially saturating said yoke in one direction, means for substantially saturating said yoke in the opposite direction, and means for detecting information denoting the binary storage condition of said yoke by collecting current from the cathode ray beam disposed within said cathode ray tube to intercept the beam as deflected by the yoke when in different binary storage conditions, and beam control means responsive to readout control signals applied thereto for forming the cathode ray beam during the readout period only.

4. A cathode ray tube operable as a static binary storage device comprising in combination beam positioning means including a plurality of magnetic deflection yokes constructed of magnetic material having a substantially rectangular hysteresis loop, each yoke including reset means for substantially saturating said yoke in one direction to establish an initial remanence condition and binary information input means for substantially saturating said yoke in the opposite direction, and means including a plurality of target electrodes for detecting information denoting the combined binary storage conditions of said yokes, each of said target electrodes being disposed within said tube to intercept, respectively, said beam as deflected by said yokes when in different combined remanence conditions, and beam control means responsive to readout control signals applied thereto for forming the electron beam during the readout period only.

5. A cathode ray tube in accordance with claim 4 including means for sequentially operating said reset circuit means, said means for establishing binary information in said yokes, and said beam forming means.

6. A cathode ray tube in accordance with claim 4 in which the magnetic beam deflection yokes are weighted to have different total magnetic lines of flux in the path of the electron beams to produce $2^n$ different deflections of said beam to direct said beam to $2^n$ different positions at the targets where $n$ is the number of deflection yokes, said target electrodes being so disposed that each will intercept said electron beam in one of its possible $2^n$ positions.

7. Electrical apparatus in accordance with claim 4 in which said plurality of magnetic deflection yoke means are each individually weighted to have different total magnetic lines of flux in the path of the electron beam to produce different deflections of said electron beam at said target electrodes.

8. A cathode ray tube operating as a binary adder comprising in combination electron beam producing means, eight target electrodes, beam positioning means including three magnetic deflection yokes constructed of a material having substantially rectangular hysteresis loop, reset means for substantially saturating all of said yokes in one direction to establish an initial remanence condition therein, each yoke including binary information input means for saturating it in the other direction, said yokes being weighted to have different total magnetic lines of flux in the path of the electron beam to produce jointly eight different deflections of said beam to direct the beam to eight different positions at the targets, said target electrodes being so disposed that each will intercept the beam in one of its possible eight positions, a delay circuit connecting to said saturating means of one of said yokes all of the target electrodes intercepting the beam when two or more of said yokes are magnetized in said other direction, and synchronizing means for sequentially operating said binary information input means for the other two yokes, said electron beam producing means and said reset means in the order stated.

References Cited in the file of this patent

UNITED STATES PATENTS

| Number | Name | Date |
|---|---|---|
| 1,719,756 | Clay | July 2, 1929 |
| 2,096,653 | Soller | Oct. 19, 1937 |
| 2,143,579 | Ruska | Jan. 10, 1939 |
| 2,185,138 | Wolff | Dec. 26, 1939 |
| 2,188,579 | Schlesinger | Jan. 30, 1940 |
| 2,204,055 | Skellett | June 11, 1940 |
| 2,237,671 | Kallmann | Apr. 8, 1941 |
| 2,332,881 | Woerner | Oct. 26, 1943 |
| 2,456,654 | Soller | Dec. 21, 1948 |
| 2,477,008 | Rosen | July 26, 1949 |
| 2,498,081 | Joel, Jr., et al. | Feb. 21, 1950 |
| 2,517,712 | Riggen | Aug. 8, 1950 |
| 2,532,747 | Van Gelder et al. | Dec. 5, 1950 |
| 2,564,908 | Kuchinsky | Aug. 21, 1951 |
| 2,588,287 | Podskalsky | Mar. 4, 1952 |